United States Patent [19]

Hay

[11] Patent Number: 5,690,322
[45] Date of Patent: Nov. 25, 1997

[54] SHOCK AND VIBRATION DAMPING MOUNT

[75] Inventor: Jean-Yves Hay, Colombes, France

[73] Assignee: Socitec Societe Pour le Commerce International et les Echanges Techniques, Sartrouville, France

[21] Appl. No.: 767,290

[22] Filed: Dec. 16, 1996

Related U.S. Application Data

[63] Continuation of Ser. No. 378,794, Jan. 26, 1995, abandoned.

[30] Foreign Application Priority Data

Feb. 3, 1994 [FR] France ............................. 94 01233

[51] Int. Cl.$^6$ ....................................... F16F 1/36
[52] U.S. Cl. ................. 267/148; 267/136; 267/154; 267/157; 267/273; 464/58
[58] Field of Search ................. 267/148, 149, 267/154, 155, 156, 157, 136, 273, 275, 277, 283, 284, 285; 280/721; 188/268, 378, 379, 380, 371-377; 464/54-60; 248/570, 636, 566, 562; 74/574

[56] References Cited

U.S. PATENT DOCUMENTS

| | | | |
|---|---|---|---|
| 339,646 | 4/1886 | Hallidie | 464/58 X |
| 906,113 | 12/1908 | Curtis | 464/57 |
| 1,601,099 | 9/1926 | Arens | 464/57 |
| 1,695,595 | 12/1928 | Larned | 267/148 |
| 1,897,542 | 2/1933 | West | 464/57 |
| 2,142,497 | 1/1939 | Clendenin | 464/58 |
| 2,469,167 | 5/1949 | Little | 188/268 X |
| 2,706,417 | 4/1955 | Waner | 464/58 |
| 2,755,079 | 7/1956 | York et al. | 267/147 |
| 2,836,912 | 6/1958 | Ranucci | 267/154 |
| 2,950,609 | 8/1960 | Goodloe | 464/58 |
| 3,023,993 | 3/1962 | Kerley | |
| 3,025,031 | 3/1962 | Kerley, Jr. | 267/148 |
| 3,165,945 | 1/1965 | Magrum | |
| 3,239,207 | 3/1966 | Camossi | 267/154 |
| 3,242,691 | 3/1966 | Robinson et al. | 464/57 |
| 3,360,225 | 12/1967 | Camossi | 267/148 |
| 3,405,537 | 10/1968 | Thearle | 464/57 |
| 3,443,451 | 5/1969 | Zieber, Jr. | 464/58 |
| 4,397,069 | 8/1983 | Camossi | 188/380 |
| 4,531,719 | 7/1985 | Hoppie et al. | 267/154 |
| 4,601,367 | 7/1986 | Bongers | 267/149 |
| 4,856,765 | 8/1989 | Kohno et al. | 267/166 |
| 4,976,417 | 12/1990 | Smith | 267/25 |
| 4,991,827 | 2/1991 | Taylor | 267/149 |
| 5,000,430 | 3/1991 | Smith | 267/154 |
| 5,120,032 | 6/1992 | Smith | 267/157 |
| 5,149,068 | 9/1992 | Brandener | 267/147 |
| 5,169,110 | 12/1992 | Snaith et al. | 267/148 |
| 5,499,790 | 3/1996 | Hay | 267/148 X |

FOREIGN PATENT DOCUMENTS

| | | | |
|---|---|---|---|
| 1369294 | 9/1963 | France . | |
| 2033193 | 12/1970 | France . | |
| 1392274 | 4/1988 | U.S.S.R. | 267/157 |

Primary Examiner—Douglas C. Butler
Attorney, Agent, or Firm—Merchant, Gould, Smith, Edell, Welter & Schmidt, P.A.

[57] ABSTRACT

This is a shock- and/or vibration-damping mount (9) between a first and second mass. It comprises a substantially straight cable comprising a plurality of multiwire strands, the cable comprising at least one portion (25) having a bulged middle part (26) forming a central cavity (27).

17 Claims, 3 Drawing Sheets

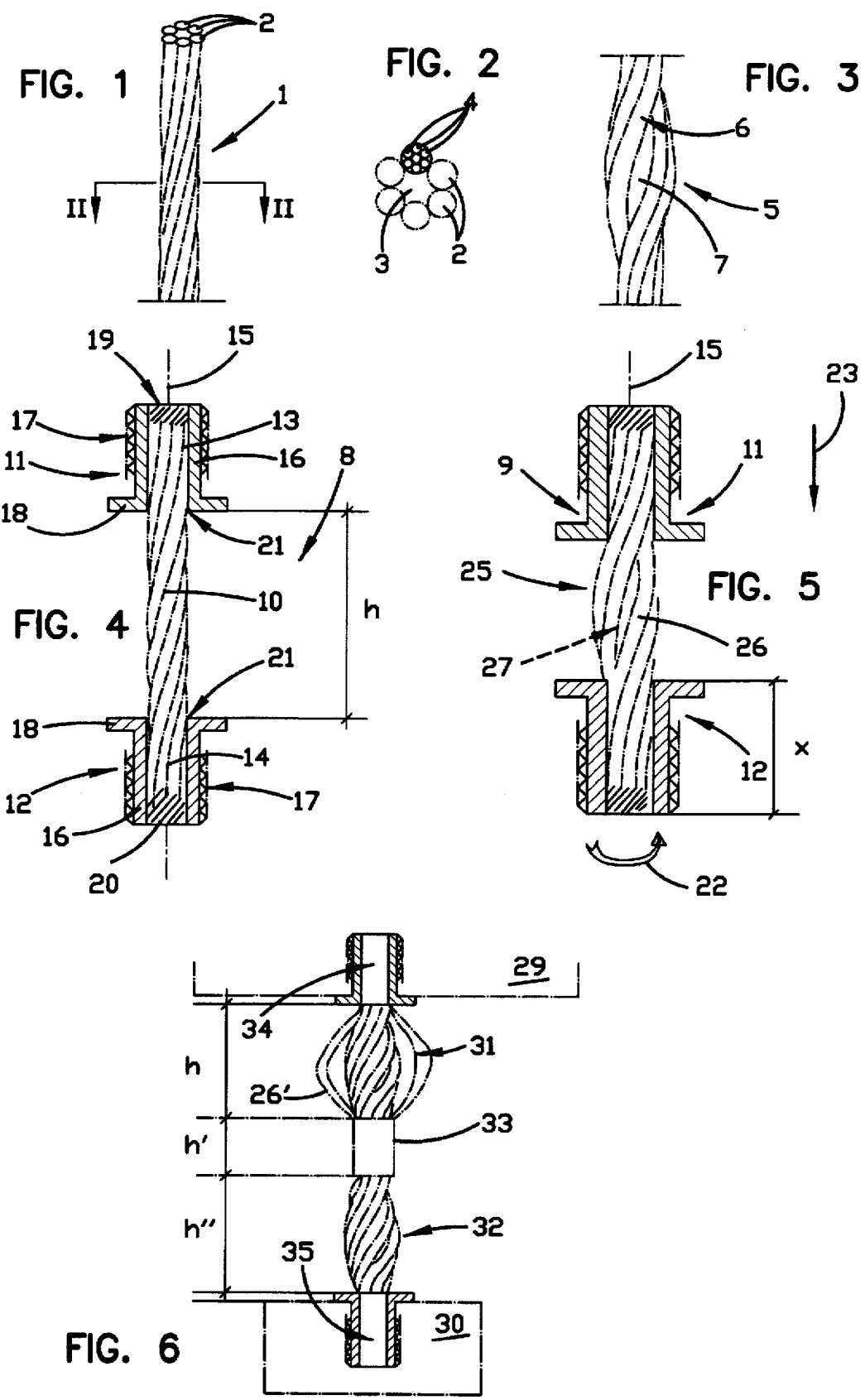

SHOCK AND VIBRATION DAMPING MOUNT

This is a Continuation of application Ser. No. 08/378,794, filed Jan. 26, 1995, now abandoned.

The present invention relates to a mount for damping shock- and/or vibration between a first mass and a second mass.

It also relates to a method of manufacturing such a mount.

One particularly important, albeit nonexclusive, application of the invention is in the field of antivibration and antishock devices vertically connecting a carrier mass to a carried mass.

Mounts are already known (EP-A-499,518) which enable shocks and vibrations between two masses to be damped, these mounts comprising metal cable portions fixed to supports fastened to the masses to be isolated.

These devices have drawbacks. In fact, they are expensive, complicated to manufacture and difficult to install.

The present invention aims to provide a damping mount and a method of manufacturing mounts, satisfying the practice requirements better than those known previously, especially in that it provides a damping mount which is very simple, has adjustable stiffness for the same cable diameter and the same height, is easy to manufacture and to instal, and which can be very stiff.

To this end, the invention essentially provides a mount for damping shock- and/or vibration between a first and a second mass, characterized in that it comprises at least one substantially straight cable comprising a plurality of multi-wire strands, said cable comprising at least one portion having a bulged middle part forming a central cavity between the strands.

This damping mount is arranged in order to have a first operating direction which is coincident with the axial direction of said mount.

By portion is meant a continuous part of the cable.

In order to form a bulge in the region of the middle part of the portion, the cable is, for example, permanently predeformed in the radial direction in order to form a bulge in the region of the middle part of the portion, the strands being further apart in this region than in the terminal parts of said portion, this having the advantage of permitting relatively large displacement and good absorption of the shocks and vibrations in the axial and radial directions of the mount.

In an advantageous embodiment, the strands of the cable are helically wound around each other with a first pitch.

Such an arrangement facilitates in particular the manufacture of the mount, the strands of which will not have a tendency to separate naturally from each other, and enables the stiffness of the mount to be increased.

Advantageously, the cable has an axial cavity in the free state. This cavity is, for example, obtained by extracting the central core or an axial group of strands, forming part of a multilayer cable, that is to say one comprising at least two concentric layers of strands.

By free state is meant the state of the cable before predeformation when it is subjected to no tensile, compressive or shear stress.

In a preferred embodiment, the cable portion is permanently deformed by twisting in the opposite sense to that of the first pitch and by compressing in the axial direction of the cable in order to form the bulged middle part of the cable portion.

In addition, in advantageous embodiments, recourse is made to one and/or other of the following arrangements:

- the mount comprises first and second means for fixing, respectively, the first and second ends of the cable portion, directly or indirectly, to the first and second masses, said first and second fixing means being located, or largely located, in the axial extension of the portion, the first pitch of the helix being longer than the distance separating the fixing means. By distance separating the fixing means should be understood the free distance of the cable between the points closest to the fixing means facing each other, when the cable is in the free state;
- the cable comprises a single portion, the means for fixing the ends of said portion being directly and respectively arranged to be fastened to said first and second masses;
- the mount comprises at least two portions, fastened together, forming part of the same cable, these being arranged axially and separated by an intermediate fixing piece fixed to the cable, for example by crimping;
- the mount comprises at least two cables separated by an intermediate piece, for example of a different diameter;
- the cable comprises at least two different types of strands;
- the wires of the strands are wound around each other in the form of a helix in the sense opposite to that of the sense of the helix formed by the strands;
- the cable comprises six strands;
- the cable comprises at least two layers of strands;
- at least one of the fixing means comprises a tubular part into which is frictionally inserted a corresponding end of the cable;
- the end of the cable is fixed to the outer end, with respect to the cable, of the tubular part of the fixing means;
- the cable is fixed to the fixing means by welding;
- the cable is fixed to the fixing means by adhesive bonding; in order to do this, the cable portion is, for example, fixed to the fixing means by coating the ends with adhesive or by depositing an adhesive or resin in the blind tubular part, that is to say the part blocked off at its end, of the fixing means;
- the cable is fixed to the fixing means by crimping;
- the cable is fixed to the fixing means by overmolding the ends of the portion with a thermosetting or elastomeric material injected between the cable ends and the tubular part of the fixing means; it is possible subsequently and for example, to crimp or shrink the tubular part of the fixing means onto the cable.
- the cable or the cable portion or portions are fixed to the fixing means by any combination of the means described hereinabove.

The invention also provides a method of manufacturing a mount for damping shock- and/or vibration mount between a first and a second mass, starting from a cable comprising a plurality of strands wound around each other in the form of a helix with a first pitch and delimiting between them an axial cavity in the free state, characterized in that

- the ends of the cable are rigidly fixed to fixing means suitable for being fastened to said masses,
- said cable is permanently deformed by compressing the mount in the axial direction and by twisting said mount in the sense opposite to that of the first pitch of the helix, so as to obtain a substantially straight cable portion having a hollowed-out and bulged central part.

Advantageously, the angle of twist and the compressive force in the axial direction are adjusted as a function of the free height and of the cable diameter for desired axial and radial stiffnesses of the mount. The adjustment is made as a function of the cable construction of the portion, known per se by the person skilled in the art.

The invention will be better understood on reading the following description of particular embodiments given by way of nonlimiting example.

The description refers to the drawings which accompany it, in which:

FIG. 1 shows a cable in the free state, comprising six helically wound multiwire strands having an axial cavity.

FIG. 2 is a section along II—II of FIG. 1.

FIG. 3 is an elevation view of an embodiment of a cable portion according to the invention.

FIG. 4 is a side view, partially in section, of a cable and its fixing points, before twisting and compression in order to form a mount according to the embodiment of the invention more particularly described here.

FIG. 5 is a side view, partially in section, of the mount obtained from the cable of FIG. 4 after twisting and compression.

FIG. 6 is a side view, in elevation, partially in section, of another embodiment of a mount according to the invention, comprising two portions.

FIG. 1 shows a metal cable 1 comprising six identical strands 2, for example of diameter d=6 mm, helically wound around a central core (not depicted since it has been removed from the cable), with a first pitch p, for example equal to 10 cm.

Figure 7A:
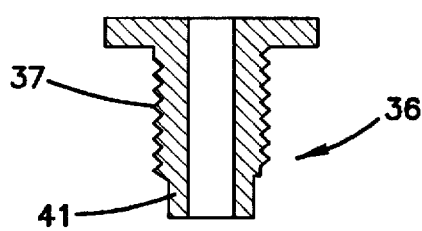
FIGS. 7A and 7B show, in section, a first embodiment of the means, forming part of a mount according to the invention, for fixing by crimping.

The cable 1 has, (see FIG. 2) an axial cavity 3 around which the six strands are angularly and uniformly distributed, each strand being respectively in contact with the two strands adjacent to it.

Each strand is, for example, constituted by seven wires 4 of diameter d'=2 mm, six wires of which are helically wound around a central straight wire with a pitch p' of sense opposite to that of the first pitch p.

FIG. 3 shows the portion 5 of a mount according to the invention, made from the cable 1 of FIG. 1.

The portion has the bulged middle part 6 forming a central cavity 7 which will permit the desired filtering of the shocks and vibrations.

FIG. 4 shows a piece 8 from which the mount 9 of FIG. 5 is obtained.

The piece 8 comprises a cable portion 10, which is straight in the free state, and first and second means 11 and 12 for fixing the respective ends 13 and 14 of the cable portion to a first and second mass (these not being depicted). The first and second means are located in the axial prolongation (axis 15) of the cable portion, the first pitch p of the helix being equal to or longer than the distance h separating the fixing means.

The fixing means 11 and 12 are identical. They comprise a metal tubular part 16, threaded on the outside at 17, of internal diameter slightly greater than the external diameter of the cable in the free state, and terminating on the side of the cable in an annular collar 18, extending radially outward, for butting against the surfaces of the masses.

The ends 13 and 14 of the cable portion are inserted into the tubular parts, with which they interact frictionally, right to the ends, respectively 19 and 20, of said tubular parts external to the cable, to which tubular parts they are respectively fixed by welding.

Advantageously, the internal edges of the collars 18 are bevelled at 21, the distance h between said collars being less than the pitch p.

FIG. 5 shows the mount 9 obtained by twisting (arrow 22) about the axis 15, in the opposite sense to the first pitch, and by compression (arrow 23) in the axial direction of the cable portion of the piece in FIG. 4.

The twisting and compression are such that, in the free state, the cable adopts a new shape which is remainingly and permanently deformed with respect to the previous one so as to have a cable portion 25 with a bulged middle part 26 forming a central and axial cavity 27, according to the invention. The bulged part is symmetrical or substantially symmetrical with respect to the axis 15, and lies within a circle of larger diameter than that of the initial cable portion.

FIG. 6 shows a two-stage mount 28 between a first mass 29 and a second mass 30, comprising two portions 31 and 32 according to the invention, which are arranged axially and separated by an intermediate piece 33.

The lengths of these two portions may be equal or different depending on the mode of operation of the mount. For example, this may be a double-stage mount constituted thus:

1st stage (height h)—low-frequency anti-vibration portion 31, with a low stiffness and a high static displacement, having a highly bulged, for example substantially spherical, middle part 26';

2nd stage (height h")—antishock portion 32 with a middle part 26 less bulged than that of the 1st stage, in order to obtain a moderate or high stiffness to enable large shocks to be absorbed, after complete collapse of the 1st stage.

The intermediate piece 33 is, for example, constituted by a tube drilled axially with a bore having a diameter slightly greater than the diameter of the straight cable portion and having a height h'. This intermediate piece 33 is crimped radially around the cable portions 31 and 32 so as to keep the lengths of the stages the same (or different), before deformation for making up said portions 31 and 32 according to this embodiment of the invention.

The intermediate piece 33 will be held radially during manufacture of the two-stage mount in order to prevent any buckling of the cable portions 31 and 32 in the compression/twisting phases, the ratio of the total height (h+h'+h") to the diameter of the portion being too great to prevent buckling during manufacture, knowing that the height h can be approximately 3 to 10 times greater than the diameter of the portion, for example 7 times greater.

In another embodiment, the mount is formed by two separate, coaxial, cable portions fixed to an intermediate piece on either side of it. The cables may have different diameters, lengths and/or constructions.

Returning to FIG. 6, the opposite ends 34 and 35 of the two portions are themselves directly and respectively fixed to the masses 29 and 30, for example via fixing means of the type of those described with reference to FIG. 4.

Such an arrangement, in the case of equal lengths of the portions, enables better shock absorption to be obtained.

Figure 7B:
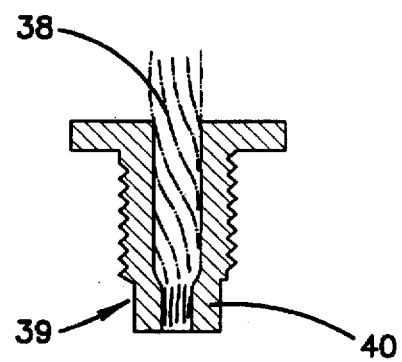

FIGS. 7a and 7b show fixing means 36 having, in this case too, a tubular part 37 having an internal diameter equal to or slightly greater than the external diameter of the cable 38, the end 39 of the latter being fixed to the end 40 of the tubular part by radially compressing said tubular end part 41 (see FIG. 7b).

Figure 8A:
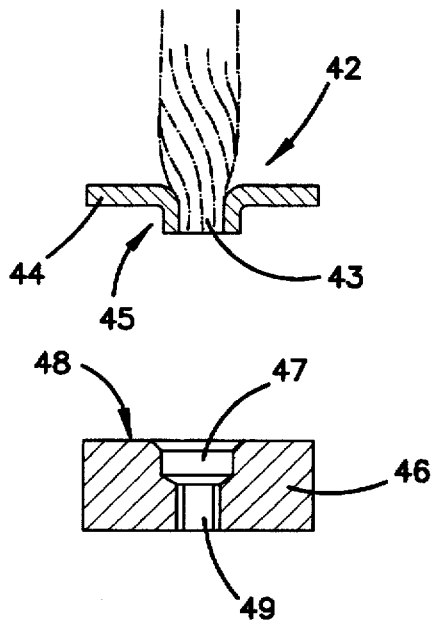
FIGS. 8A and 8B show, in section, a second embodiment of the means, forming part of a mount according to the invention, for fixing by crimping and welding of a complementary piece.
Figure 8B:
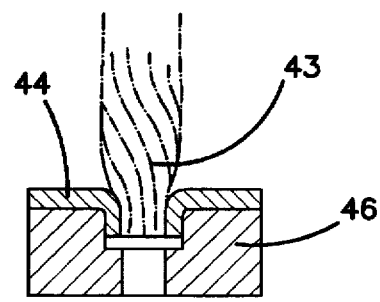

FIGS. 8a and 8b show another embodiment of the means 42 for fixing the end 43 of the cable portion by crimping this end onto a plate 44 equipped with a hole having a flange 45.

The plate 44 is then fixed, for example, by welding, to a piece 46 having, on one side, a recess 47 of shape complementary to that of the flange.

The other side of the piece 44 has, for example, a tapped bore 49 for screw fixing to one of the masses.

Figure 9:
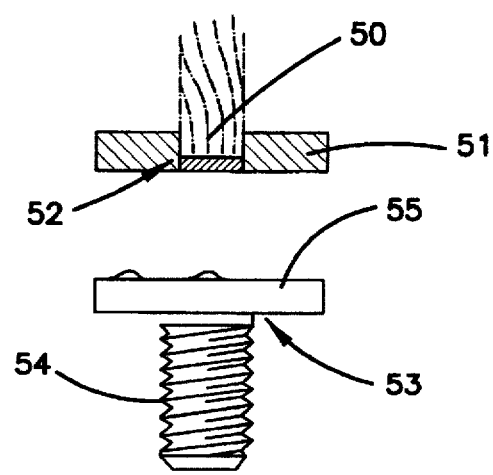
FIG. 9 shows, in section, a third embodiment of the means, forming part of a mount according to the invention, for fixing by welding and addition of a complementary piece.

FIG. 9 shows yet another embodiment of the fixing means. In this case, the end 50 of the cable is fixed by welding to a plate 51 drilled right through with a hole 52 of internal diameter equal to or slightly greater than that of said end.

A piece 53, equipped with a fixing bolt 54 and having a plate 55 for joining to the plate 51, is then fixed, for example by welding, to said plate 51.

Figure 10:
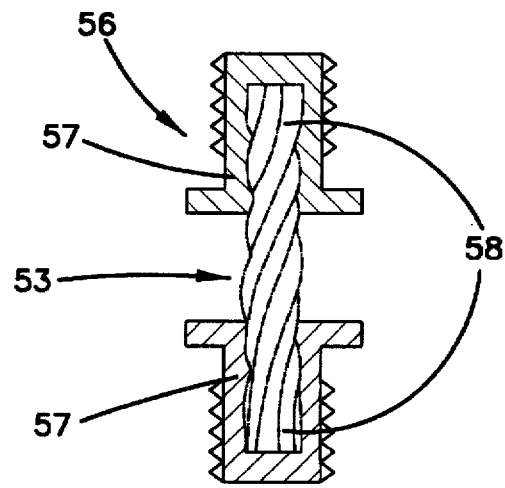
FIG. 10 shows, in section, a fourth embodiment of the means for fixing the ends of a cable, forming part of a mount according to the invention, by molding.

FIG. 10 shows another embodiment of the fixing means 56, comprising two identical end pieces 57, having a tubular shape and being threaded on the outside, molded around the ends 58 of the cable portion 59.

Figure 11:
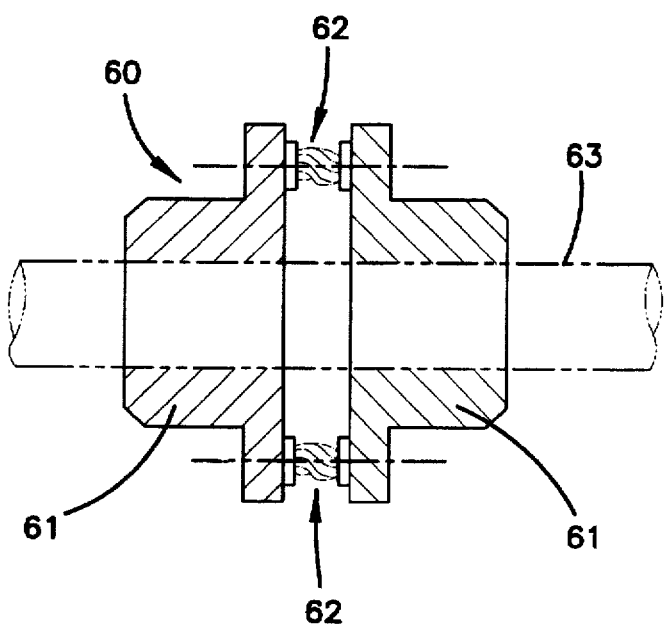
FIG. 11 is a view, in section, of a coupling between two masses, comprising two mounts according to the embodiment of the invention more particularly described here.

FIG. 11 shows a side coupling 60 between two pieces 61, using two mounts 62 according to the embodiment of the invention more particularly described here. The pieces 61 are supported axially and vertically, for example by a common shaft 63.

Figure 12:
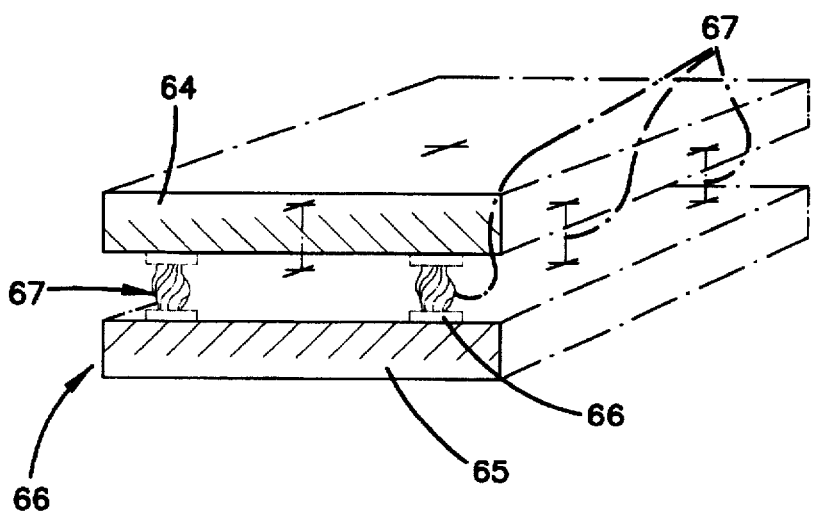
FIG. 12 is a diagrammatic view, in perspective, of a coupling between a carrier piece and a carried piece, comprising two rows of mounts according to the invention.

FIG. 12 shows a carrier plate 64 from which a carried plate 65 is suspended via two rows 66 of three mounts 67 according to the invention.

An embodiment of the method of manufacturing the mount according to the invention will now be described, referring more particularly to FIGS. 1, 4 and 5.

The multiwire multistrand cable 1, generally made of metal, is hollowed out axially by removing the central core by pulling.

Next, the cable is cut in order to form a first portion of length L.

Next, the pieces 11 and 12 are fixed to the portion. In order to do this, the tubular parts 16 are slipped over the cable until the external faces of the ends 19 and 20 of the cable are flush with the end of said tubular parts.

The overall axial dimensions x of the tubular parts are such that:

$$L-2x=h \text{ with } h \leq p$$

(p being the first pitch of the helix of the cable before deformation).

The ends 19 and 20 are then welded to the tubular parts 16, the weld in particular penetrating into the axial cavity by a small distance inside said tubular parts.

Next, by compressing and simultaneously twisting the assembly thus formed beyond the elastic limits of the cable, the mount 9 of FIG. 5, permanently deformed and having the bulged part 26, is obtained.

As goes without saying and as, moreover, resulting from the foregoing, the present invention is not limited solely to the embodiments more particularly described here. On the contrary, it encompasses all variants thereof and, in particular, those where the cable is not made of metal but of synthetic material, for example made of material known by the name KEVLAR RTM, those where the cable comprises a plurality of rows of strands, for example three rows, the case where the diameter of the strands is less than the order of half a millimeter, thereby increasing the flexibility of the damper, or greater than 2 cm, thereby increasing the stiffness, those where the angle of the tangent to the bulged middle part with the axis of the portion lies between 30° and 50°, for example equal to of the order of 45°, and those where the number of strands is greater, for example equal to eighteen or thirty-two strands, on a plurality of layers.

In the case of molding the ends of cables in the fixing means, this may advantageously be carried out using steel, aluminum, plastic and/or any injection-moldable or gravity-moldable material.

I claim:

1. A mount for damping shock or vibration between a first and a second mass, said mount comprising:

a substantially straight cable of a plurality of multiwire strands, having a first and second end, wherein said strands are helically wound with a first pitch around a central core, said central core being extracted before the strands become permanently deformed;

said cable having an axial cavity in free state and at least one portion having a bulged middle part forming a central cavity, said portion being formed with the permanent deformation of the strands, obtained by twisting said strands in the opposite sense of that first pitch and by axial compression in the longitudinal direction, respectively, according to an angle of twist and a compressive force which are adjusted as a function of desired axial and radial stiffness; and a fixing means, located in an axial extension of said portion of cable, to which ends of cable are fixed and which are suitable for being fastened to the masses.

2. Mount according to claim 1, wherein the cable is permanently predeformed by twisting in the opposite sense to that of the first pitch and by compression in the longitudinal direction, in order to form the bulged middle part of said cable portion.

3. Mount according to claim 1, wherein the mount comprises first and second means for fixing the ends of the cable portion, directly or indirectly, to said first and second masses, said first and second fixing means being located, or largely located, in the axial extension of said portion, the first pitch of the helix being longer than the distance h separating said fixing means.

4. Mount according to claim 1, wherein the cable comprises a single portion, the means for fixing the ends of said portion being directly and respectively arranged to be fastened to said first and second masses.

5. Mount according to claim 1, characterized in that it comprises at least two portions (31, 32) arranged axially and separated by an intermediate fixing piece (33) which is arranged to be fixed laterally.

6. Mount according to claim 4, characterized in that it comprises at least two cables arranged axially and separated by an intermediate fixing piece (33).

7. Mount according to claim 1, wherein the cable comprises at least two different types of strands.

8. Mount according to claim 1, characterized in that the wires of the strands are in the form of a helix, the sense of which is the opposite of the sense of the helix formed by the strands.

9. Mount according to claim 1, wherein said multiwire strand comprises six strands.

10. Mount according to claim 1, wherein said multiwire strands comprise at least two layers of strands.

11. Mount according to claim 1, wherein at least one of the fixing means (16) comprises a tubular part (16) into which is frictionally inserted a corresponding end of the cable.

12. Mount according to claim 11, wherein the end of the cable is fixed to the external, with respect to the cable, end of the tubular part.

13. Mount according to claim 1, wherein the cable is fixed to the fixing means by welding.

14. Mount according to claim 1, wherein the cable is fixed to the fixing means by adhesive bonding.

15. Mount according to claim 14, wherein the cable is fixed to the fixing means by an adhesive or resin in a blind tubular part.

16. Mount according to claim 1, wherein the cable is fixed to the fixing means by crimping.

17. Mount according to claim 16, wherein the cable is fixed to the fixing means by over-molding a thermosetting or elastomeric material between the cable and the tubular part with crimping or shrinking of the latter onto the cable.

* * * * *